US012258651B2

(12) United States Patent
He et al.

(10) Patent No.: US 12,258,651 B2
(45) Date of Patent: Mar. 25, 2025

(54) METHOD FOR EXTRACTING GERMANIUM BASED ON ACID DECOMPOSITION

(71) Applicant: KUNMING METALLURGICAL RESEARCH INSTITUTE CO., LTD., Kunming (CN)

(72) Inventors: Xiaocai He, Kunming (CN); Huixian Shi, Kunming (CN); Jiuyang Ren, Kunming (CN); Na Xu, Kunming (CN); Ye Yuan, Kunming (CN); Qingxin Xu, Kunming (CN); Yina Li, Kunming (CN); Qiugu He, Kunming (CN); Ting Ren, Kunming (CN); Yuan Xu, Kunming (CN); Weizhi Diao, Kunming (CN); Sen Yan, Kunming (CN); Hui Zhang, Kunming (CN)

(73) Assignee: KUNMING METALLURGICAL RESEARCH INSTITUTE CO., LTD., Kunming (CN)

( * ) Notice: Subject to any disclaimer, the term of this patent is extended or adjusted under 35 U.S.C. 154(b) by 0 days.

(21) Appl. No.: 18/898,820

(22) Filed: Sep. 27, 2024

(65) Prior Publication Data
US 2025/0019795 A1 Jan. 16, 2025

Related U.S. Application Data

(63) Continuation of application No. PCT/CN2024/087607, filed on Apr. 12, 2024.

(30) Foreign Application Priority Data

Jun. 27, 2023 (CN) .......................... 202310763538.7

(51) Int. Cl.
C22B 41/00 (2006.01)
C22B 3/12 (2006.01)

(52) U.S. Cl.
CPC ................ C22B 41/00 (2013.01); C22B 3/12 (2013.01)

(58) Field of Classification Search
CPC .. C22B 41/00; C22B 3/12; C22B 3/24; C22B 3/26; C22B 3/42
See application file for complete search history.

(56) References Cited

FOREIGN PATENT DOCUMENTS

| CN | 101638725 A |   | 2/2010 |
|----|-------------|---|--------|
| CN | 102181649 A |   | 9/2011 |
| CN | 103173624 A | * | 6/2013 |
| CN | 103334011 A |   | 10/2013 |

(Continued)

Primary Examiner — Rebecca Janssen
(74) Attorney, Agent, or Firm — Bayramoglu Law Offices LLC

(57) ABSTRACT

A method for extracting germanium based on acid decomposition is provided, including acid decomposition and post-treatment steps, and specifically including: adding an acid to a coal ash for conditioning to obtain a material a; heating the material a to 350° C. to 800° C., and keeping the material a at this temperature for 10 min to 10 h to obtain an acid-decomposed material b; milling the acid-decomposed material b until more than 60% of a milled material has a particle size of less than 200 mesh to obtain a material c; subjecting the material c to distillation to obtain a residual slurry d and a distillation fraction e; and hydrolyzing the distillation fraction e with a dilute hydrochloric acid solution, and then oven-drying to obtain $GeO_2$.

11 Claims, 2 Drawing Sheets

(56) References Cited

FOREIGN PATENT DOCUMENTS

| | | |
|---|---|---|
| CN | 107746965 A | 3/2018 |
| CN | 112410584 A | 2/2021 |
| CN | 116623018 A | 8/2023 |
| JP | S529000 A | 1/1977 |
| JP | 2023034679 A | 3/2023 |
| KR | 20030006739 A | 1/2003 |
| WO | WO-2023245244 A1 * | 12/2023 |

* cited by examiner

METHOD FOR EXTRACTING GERMANIUM BASED ON ACID DECOMPOSITION

CROSS REFERENCE TO THE RELATED APPLICATIONS

This application is a continuation application of International Application No. PCT/CN2024/087607, filed on Apr. 12, 2024, which is based upon and claims priority to Chinese Patent Application No. 202310763538.7, filed on Jun. 27, 2023, the entire contents of which are incorporated herein by reference.

TECHNICAL FIELD

The present disclosure belongs to the technical field of mining engineering, and specifically relates to a method for extracting germanium based on acid decomposition.

BACKGROUND

Currently, the main processes for extracting germanium inside and outside China include: the classical chlorination process, the volatilization process, the zinc powder replacement process, the distillation process (alkaline earth metal chlorination-distillation process), the fuming process, the extraction process (liquid membrane extraction process), the ion exchange process, and the like. However, the classical chlorination process, the zinc powder replacement process, the extraction method (liquid membrane extraction process), and the ion exchange process are all based on the extraction, separation, and enrichment of germanium from an enriched germanium raw material (smoke or germanium-containing aqueous solution). Germanium oxide in the coal ash of a power plant exists in the crystal structures of tetragonal germanium and hexagonal germanium. Compounds of germanium mainly exist in the form of iron germanate, calcium germanate, zinc germanate, or the like, and some also exist in the form of a solid solution such as $SiO_2 \cdot GeO_2$ or $Al_2O_3 \cdot GeO_2$. During the leaching for the germanium-containing smoke, due to different crystal structures, complicated components, diversified component phases, and inter-embedding, it is difficult to allow the efficient enrichment of germanium through conventional acid/base leaching and reduction volatilization, and the recovery rate is low. Therefore, it is very necessary to develop a method that can solve the above technical problems.

SUMMARY

An objective of the present disclosure is to provide a method for extracting germanium based on acid decomposition. A coal ash has a low germanium content and is a multi-component, multi-structure, and multi-component phase Ge material, and Ge in the coal ash can be efficiently dissolved and dissociated. This method mainly controls the migration of the metal element Ge to allow the effective extraction of Ge, which involves a simple and easy-to-operate process flow and has a high direct yield of Ge and a significant economic benefit. The present disclosure is as follows: (1) An acid ($H_2SO_4$, $H_3PO_4$, or the like) and an oxidant ($KMnO_4$, $MnO_2$, $NaNO_3$, or the like) are added to a coal ash, and melt calcination is conducted. (2) An acid-decomposed coal ash material is mechanically crushed (−200 mesh: higher than 60%). (3) A crushed acid-decomposed material is subjected to distillation to obtain a distillation fraction I and a residual slurry. The residual slurry is filtered and washed to obtain a washing residue I and a washing liquid II. (4) An alkali (NaOH, KOH, $Na_2CO_3$, $K_2CO_3$, or the like) is added to the washing residue I, and melt calcination is conducted. (5) An alkali-decomposed material is crushed. (6) A crushed alkali-decomposed material is subjected to water leaching, filtration, and washing to obtain a washing residue II and a washing liquid III. The washing residue II is stockpiled. (7) The distillation fraction I is hydrolyzed and then oven-dried to obtain $GeO_2$. (8) The washing liquid II and the washing liquid III are subjected to neutralization and precipitation to obtain a neutralizing residue III and a neutralizing liquid IV. The neutralizing liquid IV is returned as a washing liquid to water-leaching residue washing and residual slurry residue washing, and the neutralizing residue III is returned to chlorination-distillation. This method involves a simple and easy-to-operate process flow, and can allow the efficient dissociation-enrichment of germanium in a coal ash.

Or, the present disclosure is as follows: (1) An acid ($H_2SO_4$, $H_3PO_4$, or the like) and an oxidant ($KMnO_4$, $MnO_2$, $NaNO_3$, or the like) are added to a coal ash, and melt calcination is conducted. (2) An acid-decomposed coal ash material is mechanically crushed (−200 mesh: higher than 60%). (3) A crushed acid-decomposed material is subjected to distillation to obtain a distillation fraction I and a residual slurry. The residual slurry is filtered and washed to obtain a washing residue I and a washing liquid II. (4) An alkali (NaOH, KOH, or the like) is added to the washing residue I, and pressure leaching is conducted. (5) A pressure leaching solution is filtered and washed to obtain a washing residue II and a washing liquid III. The washing residue II is stockpiled. (6) The distillation fraction I is hydrolyzed and then oven-dried to obtain $GeO_2$. (7) The washing liquid II and the washing liquid III are subjected to neutralization and precipitation to obtain a neutralizing residue III and a neutralizing liquid IV. The neutralizing liquid IV is returned as a washing liquid to water-leaching residue washing and residual slurry residue washing, and the neutralizing residue III is returned to chlorination-distillation. This method involves a simple and easy-to-operate process flow, and can allow the efficient dissociation-enrichment of germanium in a coal ash.

The objective of the present disclosure is allowed as follows: The method of the present disclosure includes acid decomposition and post-treatment steps, and specifically includes:

A, acid decomposition:
1) adding an acid to a coal ash for conditioning to obtain a material a; and
2) heating the material a to a temperature of 350° C. to 800° C., and keeping the material a at the temperature for 10 min to 10 h to obtain an acid-decomposed material b; and B, post-treatment:
1) milling the acid-decomposed material b until more than 60% of a milled material has a particle size of less than 200 mesh to obtain a material c;
2) subjecting the material c to distillation to obtain a residual slurry d and a distillation fraction e;
3) hydrolyzing the distillation fraction e with a dilute hydrochloric acid solution, and then oven-drying to obtain $GeO_2$;
4) filtering and washing the residual slurry d to obtain a washing residue f and a residual mixed slurry g, where the residual mixed slurry g includes a distillation residue and a residue-washing solution; and 5) adding an alkali to the washing residue f, heating to a temperature of 350° C. to 1,000° C., and holding the temperature for 10 min to 10 h to allow alkali decomposition to obtain an alkali-decomposed material h; milling the alkali-decomposed material h until more than 60% of a milled material has a particle size of less than 200 mesh to obtain a material i; adding water to the material i according to a solid-to-liquid volume ratio of 1 to 20, stirring at 10° C. to 100° C. to allow water leaching for 0.5 h to 10 h, and filtering and washing to obtain a water-leaching washed residue j and a water-leaching mixed liquid k, where the water-leaching mixed liquid k is composed of a water-leaching solution and a water-leaching residue-washing solution; neutralizing the water-leaching mixed liquid k and the residual mixed slurry g to obtain a neutralizing residue and a neutralizing liquid; and returning the neutralizing liquid to the filtering and washing step; or adding an alkali to the washing residue f, conducting pressure alkali leaching, and filtering and washing to obtain a washing residue I and an alkali-leaching mixed liquid m; neutralizing the alkali-leaching mixed liquid m and the residual mixed slurry g to obtain a neutralizing residue and a neutralizing liquid; and returning the neutralizing liquid to the filtering and washing step.

Specific operations are as follows:

(1) A coal ash is conditioned with 0.1% to 80% of $H_2SO_4$. During the conditioning, 0.1% to 40% (based on a mass of the coal ash) of $H_3PO_4$ and 0.1% to 20% (based on the mass of the coal ash) of $KMnO_4/MnO_2/NaNO_3$ can also be added.

(2) The acid decomposition is conducted with an acid decomposition temperature of 350° C. to 800° C. and a maximum temperature residence time of 10 min to 10 h.

(3) An acid-decomposed material is subjected to wet ball-milling, rod-milling, or sand-milling until more than 60% of a milled material has a particle size of less than 200 mesh.

(4) A crushed acid-decomposed material is subjected to distillation under the following conditions: a distillation temperature: 80° C. to 200° C., distillation 1:s: 1:1 to 5:1, a HCl concentration: 6 mol/L to 12 mol/L, and a distillation endpoint pH value: lower than 0.5. 0.1% to 20% of NaCl/KCl (based on a mass of an acid decomposition residue) and 0.1% to 20% of $H_3PO_4/H_2O_2/KMnO_4$ (based on the mass of the acid decomposition residue) can be added to a distillate.

(5) A distillation residual slurry is filtered and washed. A distillation residue is mixed with a residue-washing solution to obtain a residual mixed slurry. A washing solution has a pH of less than 0.5 and is prepared with HCl.

(6) An alkali (NaOH, KOH, $Na_2CO_3$, or $K_2CO_3$) is added to a distillation washing residue, where an amount of the alkali is 1.0 to 10 times an amount of the distillation washing residue (based on a mass of the distillation washing residue). The alkali decomposition is conducted with an alkali decomposition temperature of 350° C. to 1,000° C. and a maximum temperature residence time of 10 min to 10 h. During the alkali decomposition, a half of the alkali and the coal ash are mixed and poured into a crucible to obtain a mixture, and then a surface of the mixture is covered with the other half of the alkali.

(7) An alkali-decomposed material is subjected to wet ball-milling, rod-milling, or sand-milling until more than 60% of a milled material has a particle size of less than 200 mesh.

(8) A crushed alkali-decomposed material is subjected to water leaching under the following process conditions: a water-leaching temperature: room temperature to 100° C., a liquid-to-solid ratio: 1:1 to 20:1, a water-leaching time: 0.5 h to 10 h, a rotational speed for mechanical stirring: 20 r/min to 1,000 r/min, and a water-leaching endpoint pH value: higher than 13.5.

(9) After the water leaching, filtration and washing are conducted. A filtrate is mixed with a washing solution to obtain a water-leaching mixed liquid. The washing solution for the water leaching has a pH of greater than 13.5, and is prepared with an alkali having the same cation as the alkali used for alkali decomposition.

(10) The water-leaching mixed liquid and the residual mixed slurry are neutralized to a pH of 1 to 4.1.

(11) A distillation fraction is hydrolyzed with a 2 mol/L dilute hydrochloric acid solution, filtered, washed, and oven-dried to obtain germanium oxide.

Or, operations are as follows:

(1) A coal ash is conditioned with 0.1% to 80% of $H_2SO_4$. During the conditioning, 0.1% to 40% (based on a mass of the coal ash) of $H_3PO_4$ and 0.1% to 20% (based on the mass of the coal ash) of $KMnO_4/MnO_2/NaNO_3$ can also be added.

(2) The acid decomposition is conducted with an acid decomposition temperature of 350° C. to 800° C. and a maximum temperature residence time of 10 min to 10 h.

(3) An acid-decomposed material is subjected to wet ball-milling, rod-milling, or sand-milling until more than 60% of a milled material has a particle size of less than 200 mesh.

(4) A crushed acid-decomposed material is subjected to distillation under the following conditions: a distillation temperature: 80° C. to 200° C., distillation 1:s: 1:1 to 5:1, a HCl concentration: 6 mol/L to 12 mol/L, and a distillation endpoint pH value: lower than 0.5. 0.1% to 20% of NaCl/KCl (based on a mass of an acid decomposition residue) and 0.1% to 20% of $H_3PO_4/H_2O_2/KMnO_4$ (based on the mass of the acid decomposition residue) can be added to a distillate.

(5) A distillation residual slurry is filtered and washed. A distillation residue is mixed with a residue-washing solution to obtain a residual mixed slurry. A washing solution has a pH of less than 0.5 and is prepared with HCl.

(6) An alkali (NaOH, KOH, LiOH, choline ($HOCH_2CH_2N(CH_3)_3(OH)$), a quaternary ammonium base ($NR_4OH$), sodium alkoxide, or the like) is added to a distillation washing residue, and then pressure alkali leaching is conducted under the following conditions: an alkali-leaching temperature: 100° C. to 200° C., an alkali-leaching time: 0.1 h to 10 h, 1:s: 1:1 to 20:1, an alkali concentration: 10 g/L to 400 g/L, a rotational speed for mechanical stirring: 20 r/min to 1,000 r/min, and an alkali-leaching endpoint pH value: higher than 13.5.

(7) After the alkali leaching, filtration and washing are conducted. A filtrate is mixed with a washing solution to obtain an alkali-leaching mixed liquid. The washing solution for the alkali leaching has a pH of greater than 13.5, and is prepared with an alkali having the same cation as the alkali used for alkali decomposition.

(8) The alkali-leaching mixed liquid and the residual mixed slurry are neutralized to a pH of 1 to 4.1.

(9) A distillation fraction is hydrolyzed with a 2 mol/L dilute hydrochloric acid solution, filtered, washed, and oven-dried to obtain germanium oxide.

DETAILED DESCRIPTION OF THE EMBODIMENTS

Figure 1:
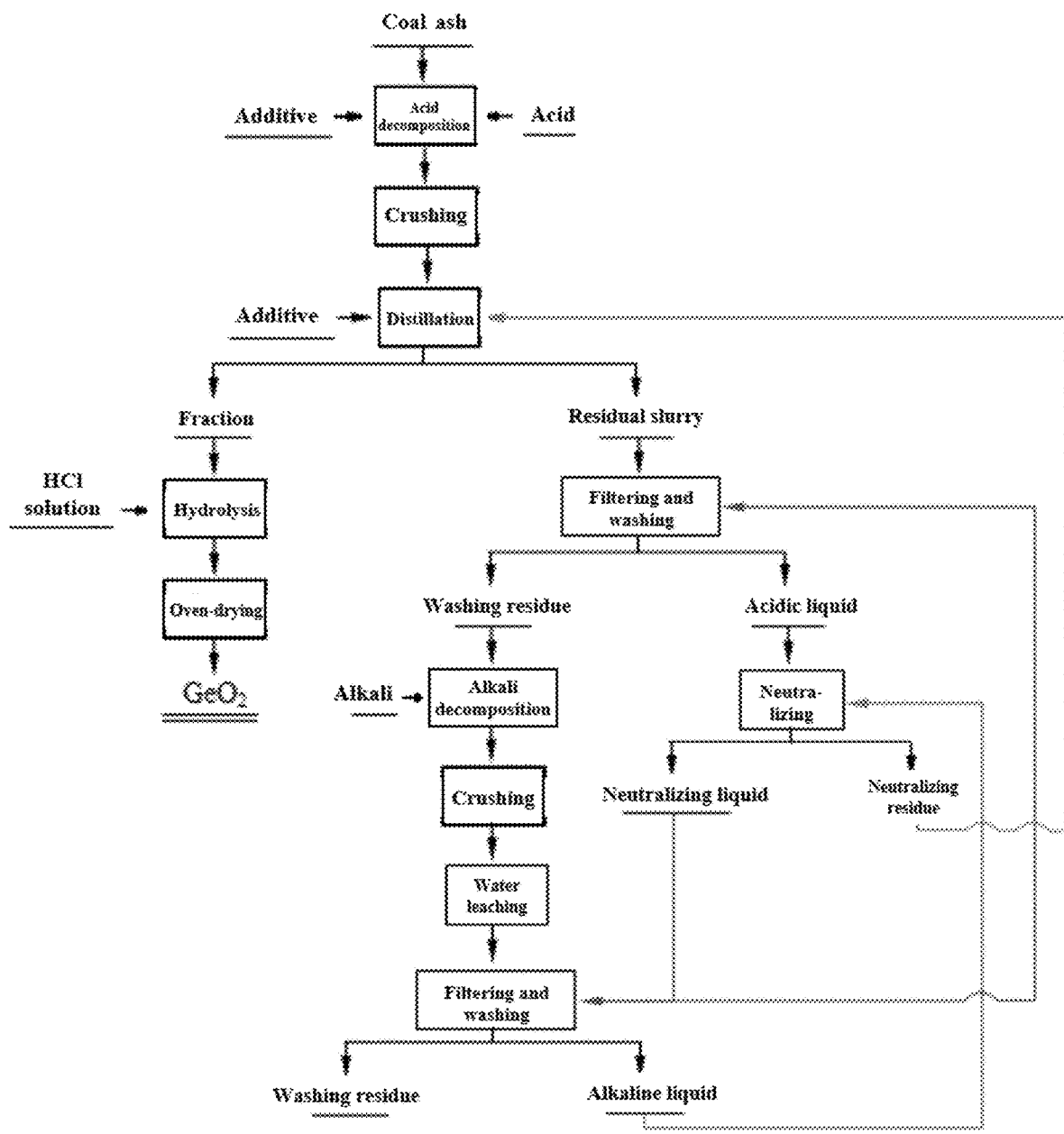
FIG. 1 is a schematic diagram of a process flow of the present disclosure.
Figure 2:
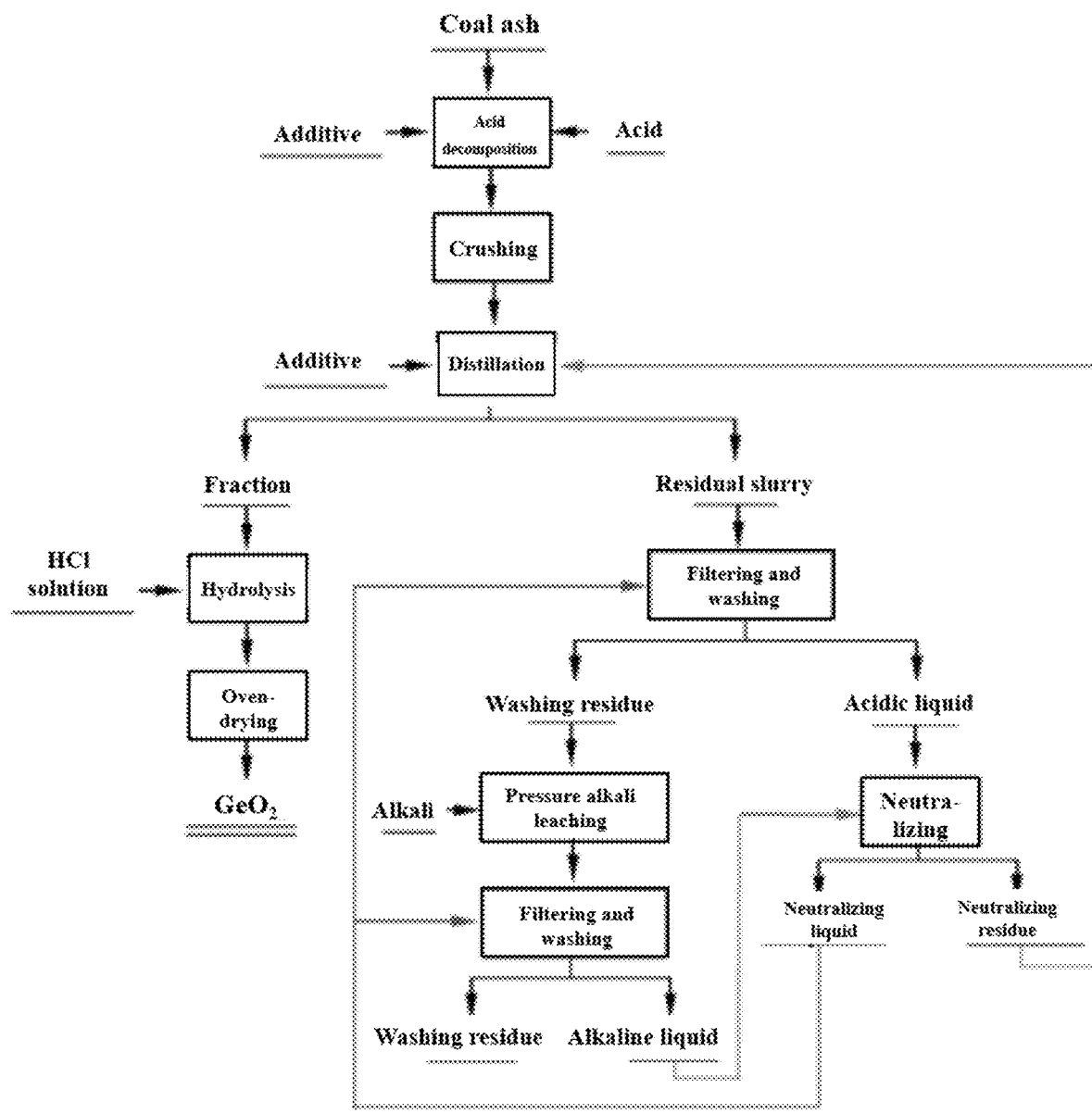
FIG. 2 is a schematic diagram of another process flow of the present disclosure.

The present disclosure is further described below in conjunction with embodiments, but is not limited thereto. Any transformation or replacement made based on the teachings of the present disclosure falls within the protection scope of the present disclosure.

The method for extracting germanium based on acid decomposition in the present disclosure includes acid decomposition and post-treatment steps and specifically includes:

A, Acid decomposition:
1) An acid is added to a coal ash for conditioning to obtain a material a.
2) The material a is heated to 350° C. to 800° C. and kept at the temperature for 10 min to 10 h to obtain an acid-decomposed material b.

B, Post-treatment:
1) The acid-decomposed material b is milled until more than 60% of a milled material has a particle size of less than 200 mesh to obtain a material c;
2) The material c is subjected to distillation to obtain a residual slurry d and a distillation fraction e.
3) The distillation fraction e is hydrolyzed with a dilute hydrochloric acid solution, and then oven-dried to obtain $GeO_2$.
4) The residual slurry d is filtered and washed to obtain a washing residue f and a residual mixed slurry g, where the residual mixed slurry g includes a distillation residue and a residue-washing solution.
5) An alkali is added to the washing residue f, and the washing residue is heated to 350° C. to 1,000° C. and kept at this temperature for 10 min to 10 h to allow alkali decomposition to obtain an alkali-decomposed material h. The alkali-decomposed material h is milled until more than 60% of a milled material has a particle size of less than 200 mesh to obtain a material i. Water is added to the material i according to a solid-to-liquid volume ratio of 1 to 20, stirring is conducted at 10° C. to 100° C. to allow water leaching for 0.5 h to 10 h, and filtration and washing are conducted to obtain a water-leaching washed residue j and a water-leaching mixed liquid k, where the water-leaching mixed liquid k is composed of a water-leaching solution and a water-leaching residue-washing solution. The water-leaching mixed liquid k and the residual mixed slurry g are neutralized to obtain a neutralizing residue and a neutralizing liquid. The neutralizing liquid is returned to the filtering and washing step. Or, An alkali is added to the washing residue f, pressure alkali leaching is conducted, and filtration and washing are conducted to obtain a washing residue I and an alkali-leaching mixed liquid m. The alkali-leaching mixed liquid m and the residual mixed slurry g are neutralized to obtain a neutralizing residue and a neutralizing liquid. The neutralizing liquid is returned to the filtering and washing step.

The acid in the step 1) of A is $H_2SO_4$.

An amount of the acid added is 0.1% to 80% of a mass of the coal ash.

The conditioning in the step A further includes: $H_3PO_4$ is added at an amount 0.1% to 40% of a mass of the coal ash and $KMnO_4$, $MnO_2$, or $NaNO_3$ is added at an amount 0.1% to 20% of the mass of the water-leaching washed residue c.

The distillation in the step 2) of B is conducted under the following conditions: a distillation temperature: 80° C. to 200° C., distillation 1:s: 1:1 to 5:1 (a ratio of a volume of a liquid to a mass of a solid during the distillation), a HCl concentration: 6 mol/L to 12 mol/L, and a distillation endpoint pH value: lower than 0.5.

In the step 3) of B, a concentration of the dilute hydrochloric acid solution is 1 mol/L to 3 mol/L.

The alkali decomposition in the step 5) of B is conducted as follows: a half of the alkali is mixed with the coal ash to obtain a mixture, the mixture is poured into a crucible, a surface of the mixture is covered with the other half of the alkali, and the alkali decomposition is conducted.

The stirring for the water leaching in the step 5) of B is conducted at a rotational speed of 20 r/min to 1,000 r/min.

The alkali leaching in the step 5) of B is conducted under the following conditions: an alkali-leaching temperature: 100° C. to 200° C., an alkali-leaching time: 0.1 h to 10 h, 1:s: 1:1 to 20:1 (a ratio of a volume of a liquid to a mass of a solid during the alkali leaching), an alkali concentration: 10 g/L to 400 g/L, a rotational speed for mechanical stirring: 20 r/min to 1,000 r/min, and an alkali-leaching endpoint pH value: higher than 13.5.

In the step 5) of B, the alkali used for the alkali decomposition is one or more of NaOH, KOH, $Na_2CO_3$, and $K_2CO_3$; and the alkali used for the alkali leaching is one or more of NaOH, KOH, LiOH, choline ($HOCH_2CH_2N(CH_3)_3(OH)$), a quaternary ammonium base ($NR_4OH$), and sodium alkoxide.

The present disclosure is further described below with reference to specific examples.

Example 1

(1) 100 g of a coal ash (including germanium at 3,657 g/t) was taken and conditioned with 55 g of 98% concentrated $H_2SO_4$. During the conditioning, 20% (based on a mass of the coal ash) of $H_3PO_4$ and 50% (based on the mass of the coal ash) of $KMnO_4$ were added.

(2) The acid decomposition was conducted with an acid decomposition temperature of 650° C. and a maximum temperature residence time of 1 h.

(3) An acid-decomposed material was rod-milled at a rotational speed of 100 r/min for 1 h until more than 75% of a rod-milled material had a particle size of less than 200 mesh.

(4) 142 g of a crushed acid-decomposed material was subjected to distillation under the following conditions: a distillation temperature: 140° C., distillation 1:s: 3.6:1, a HCl concentration: 7 mol/L, and a distillation endpoint pH value: lower than 0.5. 20% of NaCl (based on a mass of an acid decomposition residue) and 2% of $KMnO_4$ (based on the mass of the acid decomposition residue) were added to a distillate.

(5) A distillation residual slurry was filtered and washed. A distillation residue was mixed with a residue-washing solution (HCl concentration: 20 g/L) to obtain a residual mixed slurry.

(6) 75 g of NaOH was added to 50 g of a distillation washing residue, and the alkali decomposition was conducted with an alkali decomposition temperature of 650° C. and a maximum temperature residence time of 1 h. During the alkali decomposition, a half of the alkali and the coal ash were mixed and poured into a crucible to obtain a mixture, and then a surface of the mixture was covered with the other half of the alkali.

(7) An alkali-decomposed material was rod-milled at a rotational speed of 100 r/min for 1 h until more than 78% of a rod-milled material had a particle size of less than 200 mesh.

(8) 135 g of a crushed alkali-decomposed material was subjected to water leaching under the following process conditions: a water-leaching temperature: room temperature to 85° C., a liquid-to-solid ratio: 4:1, a water-leaching time: 1.5 h, a rotational speed for mechanical stirring: 180 r/min, and a water-leaching endpoint pH value: higher than 13.5.

(9) After the water leaching, filtration and washing were conducted. A filtrate was mixed with a washing solution to obtain a water-leaching mixed liquid. The washing solution was a 15 g/L NaOH solution.

(10) The water-leaching mixed liquid and the residual mixed slurry were neutralized to a pH of 1 to 2.

(11) A distillation fraction was hydrolyzed with a 2 mol/L dilute hydrochloric acid solution, filtered, washed, and oven-dried to obtain germanium oxide.

(12) After the coal ash was subjected to extraction-separation-enrichment, a germanium content decreased from 3,657 g/t in the coal ash to 281 g/t in a water-leaching washed residue, indicating a germanium recovery rate of 99.91%.

Example 2

(1) 100 g of a coal ash (including germanium at 3,657 g/t) was taken and conditioned with 55 g of 98% concentrated $H_2SO_4$. During the conditioning, 20% (based on a mass of the coal ash) of $H_3PO_4$ and 5% (based on the mass of the coal ash) of $KMnO_4$ were added.

(2) The acid decomposition was conducted with an acid decomposition temperature of 750° C. and a maximum temperature residence time of 1 h.

(3) An acid-decomposed material was ball-milled at a rotational speed of 400 r/min for 1 h until more than 83% of a ball-milled material had a particle size of less than 200 mesh.

(4) 139.19 g of a crushed acid-decomposed material was subjected to distillation under the following conditions: a distillation temperature: 140° C., distillation l:s: 3.6:1, a HCl concentration: 8.9 mol/L, and a distillation endpoint pH value: lower than 0.5. 48% of $H_3PO_4$ (based on a mass of an acid decomposition residue) and 7% of $KMnO_4$ (based on the mass of the acid decomposition residue) were added to a distillate.

(5) A distillation residual slurry was filtered and washed. A distillation residue was mixed with a residue-washing solution (HCl concentration: 20 g/L) to obtain a residual mixed slurry.

(6) 125 g of NaOH was added to 50 g of a distillation washing residue, and the alkali decomposition was conducted with an alkali decomposition temperature of 650° C. and a maximum temperature residence time of 1 h. During the alkali decomposition, a half of the alkali and the coal ash were mixed and poured into a crucible to obtain a mixture, and then a surface of the mixture was covered with the other half of the alkali.

(7) An alkali-decomposed material was ball-milled at a rotational speed of 400 r/min for 1 h until more than 82% of a ball-milled material had a particle size of less than 200 mesh.

(8) 141 g of a crushed alkali-decomposed material was subjected to water leaching under the following process conditions: a water-leaching temperature: room temperature to 85° C., a liquid-to-solid ratio: 4:1, a water-leaching time: 1 h, a rotational speed for mechanical stirring: 180 r/min, and a water-leaching endpoint pH value: higher than 13.5.

(9) After the water leaching, filtration and washing were conducted. A filtrate was mixed with a washing solution to obtain a water-leaching mixed liquid. The washing solution was a 15 g/L NaOH solution.

(10) The water-leaching mixed liquid and the residual mixed slurry were neutralized to a pH of 1 to 2.

(11) A distillation fraction was hydrolyzed with a 2 mol/L dilute hydrochloric acid solution, filtered, washed, and oven-dried to obtain germanium oxide.

(12) After the coal ash was subjected to extraction-separation-enrichment, a germanium content decreased from 3,657 g/t in the coal ash to 146.5 g/t in a water-leaching washed residue, indicating a germanium recovery rate of 98.88%.

Example 3

(1) 100 g of a coal ash (including germanium at 3,657 g/t) was taken and conditioned with 55 g of 98% concentrated $H_2SO_4$. During the conditioning, 20% (based on a mass of the coal ash) of $H_3PO_4$ and 10% (based on the mass of the coal ash) of $KMnO_4$ were added.

(2) The acid decomposition was conducted with an acid decomposition temperature of 630° C. and a maximum temperature residence time of 30 min.

(3) An acid-decomposed material was sand-milled at a rotational speed of 1,000 r/min until more than 99% of a sand-milled material had a particle size of less than 200 mesh.

(4) 141.97 g of a crushed acid-decomposed material was subjected to distillation under the following conditions: a distillation temperature: 140° C., distillation l:s: 3.6:1, a HCl concentration: 6 mol/L, and a distillation endpoint pH value: lower than 0.5.

(5) A distillation residual slurry was filtered and washed. A distillation residue was mixed with a residue-washing solution (HCl concentration: 20 g/L) to obtain a residual mixed slurry.

(6) 100 g of $Na_2CO_3$ was added to 50 g of a distillation washing residue, and the alkali decomposition was conducted with an alkali decomposition temperature of 650° C. and a maximum temperature residence time of 1 h. During the alkali decomposition, a half of the alkali and the coal ash were mixed and poured into a crucible to obtain a mixture, and then a surface of the mixture was covered with the other half of the alkali.

(7) An alkali-decomposed material was sand-milled at a rotational speed of 1,000 r/min until more than 99% of a sand-milled material had a particle size of less than 200 mesh.

(8) 90.7 g of a crushed alkali-decomposed material was subjected to water leaching under the following process conditions: a water-leaching temperature: room temperature to 85° C., a liquid-to-solid ratio: 4:1, a water-leaching time: 1.5 h, a rotational speed for mechanical stirring: 180 r/min, and a water-leaching endpoint pH value: higher than 13.5.

(9) After the water leaching, filtration and washing were conducted. A filtrate was mixed with a washing solution to obtain a water-leaching mixed liquid. The washing solution was a 15 g/L NaOH solution.

(10) The water-leaching mixed liquid and the residual mixed slurry were neutralized to a pH of 1 to 2.

(11) A distillation fraction was hydrolyzed with a 2 mol/L dilute hydrochloric acid solution, filtered, washed, and oven-dried to obtain germanium oxide.

(12) After the coal ash was subjected to extraction-separation-enrichment, a germanium content decreased from 3,657 g/t in the coal ash to 383.8 g/t in a water-leaching washed residue, indicating a germanium recovery rate of 99.85%.

Example 4

(1) 200 g of a coal ash (including germanium at 3,657 g/t) was taken and conditioned with 110 g of 98% concentrated $H_2SO_4$. During the conditioning, 10% (based on a mass of the coal ash) of $NaNO_3$ was added.

(2) The acid decomposition was conducted with an acid decomposition temperature of 650° C. and a maximum temperature residence time of 1 h.

(3) An acid-decomposed material was rod-milled at a rotational speed of 100 r/min for 1 h until more than 76% of a rod-milled material had a particle size of less than 200 mesh.

(4) 100 g of a crushed acid-decomposed material was subjected to distillation under the following conditions: a distillation temperature: 145° C., distillation l:s: 5:1, a HCl concentration: 6 mol/L, and a distillation endpoint pH value: lower than 0.5. 10% of NaCl (based on a mass of the acid-decomposed material) and 17% of 85% $H_3PO_4$ (based on the mass of the acid-decomposed material) were added to a distillate.

(5) A distillation residual slurry was filtered and washed. A distillation residue was mixed with a residue-washing solution (HCl concentration: 20 g/L) to obtain a residual mixed slurry.

(6) 160 g of NaOH was added to 50 g (dry weight) of a distillation washing residue. With a liquid-to-solid ratio of 10:1, the pressure leaching was conducted for 1 h at 150° C. under stirring at a rotational speed of 500 r/min.

(7) After the pressure alkali leaching, filtration and washing were conducted. A filtrate was mixed with a washing solution to obtain an alkali-leaching mixed liquid. The washing solution was a 15 g/L NaOH solution.

(8) The alkali-leaching mixed liquid and the residual mixed slurry were neutralized to a pH of 1 to 3.

(9) A distillation fraction was hydrolyzed with a 2 mol/L dilute hydrochloric acid solution, filtered, washed, and oven-dried to obtain germanium oxide.

(10) After the coal ash was subjected to extraction-separation-enrichment, a germanium content decreased from 3,657 g/t in the coal ash to 362 g/t in a water-leaching washed residue, indicating a germanium recovery rate of 97.52%.

Example 5

(1) 100 g of a coal ash (including germanium at 3,657 g/t) was taken and conditioned with 55 g of 98% concentrated $H_2SO_4$.

(2) The acid decomposition was conducted with an acid decomposition temperature of 650° C. and a maximum temperature residence time of 1 h.

(3) An acid-decomposed material was rod-milled at a rotational speed of 100 r/min for 1 h until more than 77% of a rod-milled material had a particle size of less than 200 mesh.

(4) 100 g of a crushed acid-decomposed material was subjected to distillation under the following conditions: a distillation temperature: 138° C., distillation l:s: 5:1, a HCl concentration: 6 mol/L, and a distillation endpoint pH value: lower than 0.5. 10% of NaCl (based on a mass of the acid-decomposed material) and 68% of 85% $H_3PO_4$ (based on the mass of the acid-decomposed material) were added to a distillate.

(5) A distillation residual slurry was filtered and washed. A distillation residue was mixed with a residue-washing solution (HCl concentration: 20 g/L) to obtain a residual mixed slurry.

(6) 160 g of choline ($HOCH_2CH_2N(CH_3)_3(OH)$) was added to 60.37 g (dry weight) of a distillation washing residue. With a liquid-to-solid ratio of 10:1, the pressure leaching was conducted for 1 h at 120° C. under stirring at a rotational speed of 600 r/min.

(7) After the pressure alkali leaching, filtration and washing were conducted. A filtrate was mixed with a washing solution to obtain a water-leaching mixed liquid. The washing solution was a 15 g/L NaOH solution.

(8) The alkali-leaching mixed liquid and the residual mixed slurry were neutralized to a pH of 2 to 3.

(9) A distillation fraction was hydrolyzed with a 2 mol/L dilute hydrochloric acid solution, filtered, washed, and oven-dried to obtain germanium oxide.

(10) After the coal ash was subjected to extraction-separation-enrichment, a germanium content decreased from 3,657 g/t in the coal ash to 519 g/t in a water-leaching washed residue, indicating a germanium recovery rate of 91.43%.

What is claimed is:

1. A method for extracting germanium based on an acid decomposition, comprising an acid decomposition step and a post-treatment step, wherein the acid decomposition step comprises sub-steps of:
1) adding an acid to a coal ash containing germanium for a conditioning to obtain a first material; and
2) heating the first material to a temperature of 350° C. to 800° C., and keeping the first material at the temperature of 350° C. to 800° C. for 10 min to 10 h to obtain an acid-decomposed material; and the post-treatment step comprises sub-steps of:
1) milling the acid-decomposed material until more than 60% of a first milled material has a particle size of less than 200 mesh to obtain a second material;
2) subjecting the second material to a distillation to obtain a residual slurry and a distillation fraction;
3) hydrolyzing the distillation fraction with a dilute hydrochloric acid solution, and then oven-drying to obtain $GeO_2$;
4) filtering and washing the residual slurry to obtain a first washing residue and a residual mixed slurry, wherein the residual mixed slurry comprises a distillation residue and a residue-washing solution; and
5) adding an first alkali to the first washing residue, heating to a temperature of 350° C. to 1,000° C., and holding the temperature of 350° C. to 1,000° C. for 10 min to 10 h to allow an alkali decomposition to obtain an alkali-decomposed material; milling the alkali-decomposed material until more than 60% of a second milled material has the particle size of less than 200 mesh to obtain a third material; adding water to the third material according to a solid-to-liquid volume ratio of 1 to 20, stirring at 10° C. to 100° C. to allow a water leaching for 0.5 h to 10 h, and filtering and washing to obtain a water-leaching washed residue and a water-leaching mixed liquid, wherein the water-leaching mixed liquid comprises a water-leaching solution and a water-leaching residue-washing solution; neutralizing the water-leaching mixed liquid and the residual mixed slurry to obtain a first neutralizing residue and a first neutralizing liquid; and returning the first neutralizing liquid to the sub-step of filtering and washing; or adding a second alkali to the first washing residue, conducting a pressure alkali leaching, and filtering and washing to obtain a second washing residue and an alkali-leaching mixed liquid;

neutralizing the alkali-leaching mixed liquid and the residual mixed slurry to obtain a second neutralizing residue and a second neutralizing liquid; and returning the second neutralizing liquid to the sub-step of filtering and washing.

2. The method for extracting the germanium based on the acid decomposition according to claim 1, wherein the acid in the sub-step 1) of the acid decomposition step is $H_2SO_4$.

3. The method for extracting the germanium based on the acid decomposition according to claim 1, wherein an amount of the acid added is 0.1% to 80% of a mass of the coal ash.

4. The method for extracting the germanium based on the acid decomposition according to claim 1, wherein the conditioning in the acid decomposition step further comprises: adding $H_3PO_4$ at an amount 0.1% to 40% of a mass of the coal ash and adding $KMnO_4$, $MnO_2$, or $NaNO_3$ at an amount 0.1% to 20% of the mass of the water-leaching washed residue.

5. The method for extracting the germanium based on the acid decomposition according to claim 1, wherein the distillation in the sub-step 2) of the post-treatment step is conducted under the following conditions: a distillation temperature: 80° C. to 200° C., a ratio of a volume of a liquid to a mass of a solid during the distillation: 1:1 to 5:1, a HCl concentration: 6 mol/L to 12 mol/L, and a distillation endpoint pH value: lower than 0.5.

6. The method for extracting the germanium based on the acid decomposition according to claim 1, wherein in the sub-step 3) of the post-treatment step, a concentration of the dilute hydrochloric acid solution is 1 mol/L to 3 mol/L.

7. The method for extracting the germanium based on the acid decomposition according to claim 1, wherein the alkali decomposition in the sub-step 5) of the post-treatment step is conducted as follows: mixing a first half of the first alkali with the coal ash to obtain a mixture, pouring the mixture into a crucible, covering a surface of the mixture with second half of the first alkali, and conducting the alkali decomposition.

8. The method for extracting the germanium based on the acid decomposition according to claim 1, wherein the stirring for the water leaching in the sub-step 5) of the post-treatment step is conducted at a rotational speed of 20 r/min to 1,000 r/min.

9. The method for extracting the germanium based on the acid decomposition according to claim 1, wherein the pressure alkali leaching in the sub-step 5) of the post-treatment step is conducted under the following conditions: an alkali-leaching temperature: 100° C. to 200° C., an alkali-leaching time: 0.1 h to 10 h, a ratio of a volume of a liquid to a mass of a solid during the pressure alkali leaching: 1:1 to 20:1, an alkali concentration: 10 g/L to 400 g/L, a rotational speed for a mechanical stirring: 20 r/min to 1,000 r/min, and an alkali-leaching endpoint pH value: higher than 13.5.

10. The method for extracting the germanium based on the acid decomposition according to claim 1, wherein in the sub-step 5) of the post-treatment step, the first alkali used for the alkali decomposition is one or more of NaOH, KOH, $Na_2CO_3$, and $K_2CO_3$; and the second alkali used for the pressure alkali leaching is one or more of NaOH, KOH, LiOH, choline ($HOCH_2CH_2N(CH_3)_3(OH)$), a quaternary ammonium base ($NR_4OH$), and a sodium alkoxide.

11. The method for extracting the germanium based on the acid decomposition according to claim 2, wherein an amount of the acid added is 0.1% to 80% of a mass of the coal ash.

* * * * *